United States Patent [19]

Lee

[11] 3,970,218

[45] July 20, 1976

[54] CAP SELECTING AND FEEDING MECHANISM

[76] Inventor: Wing J. Lee, 1322 Neck Road, Brooklyn, N.Y. 11229

[22] Filed: Feb. 20, 1975

[21] Appl. No.: 551,411

[52] U.S. Cl. ............................. 221/157; 198/287; 221/15; 221/296; 221/13
[51] Int. Cl.² ....................................... B65H 9/00
[58] Field of Search ........................... 221/156–158, 221/171, 172, 173, 296, 9–14; 222/13–15, 56, 70; 198/287, 288, 255

[56] References Cited
UNITED STATES PATENTS

| | | | |
|---|---|---|---|
| 640,757 | 1/1900 | Gates et al. | 221/158 |
| 1,908,855 | 5/1933 | Makenny | 221/156 |
| 2,696,285 | 12/1954 | Zenlea | 221/156 |
| 3,282,464 | 11/1966 | Kohl et al. | 221/10 |
| 3,414,112 | 12/1968 | Ravn | 221/171 |

Primary Examiner—Robert B. Reeves
Assistant Examiner—H. Grant Skaggs
Attorney, Agent, or Firm—Clarence A. O'Brien; Harvey B. Jacobson

[57] ABSTRACT

Caps loaded into the hopper of a machine are gravitationally fed at a controlled feed rate and are distributed into a plurality of guide channels. Movement of each cap through a guide channel is momentarily interruped to obtain a desired spaced relationship for reorientation if required. The infeed rate of caps is controlled in conjunction with the reorientation process.

16 Claims, 12 Drawing Figures

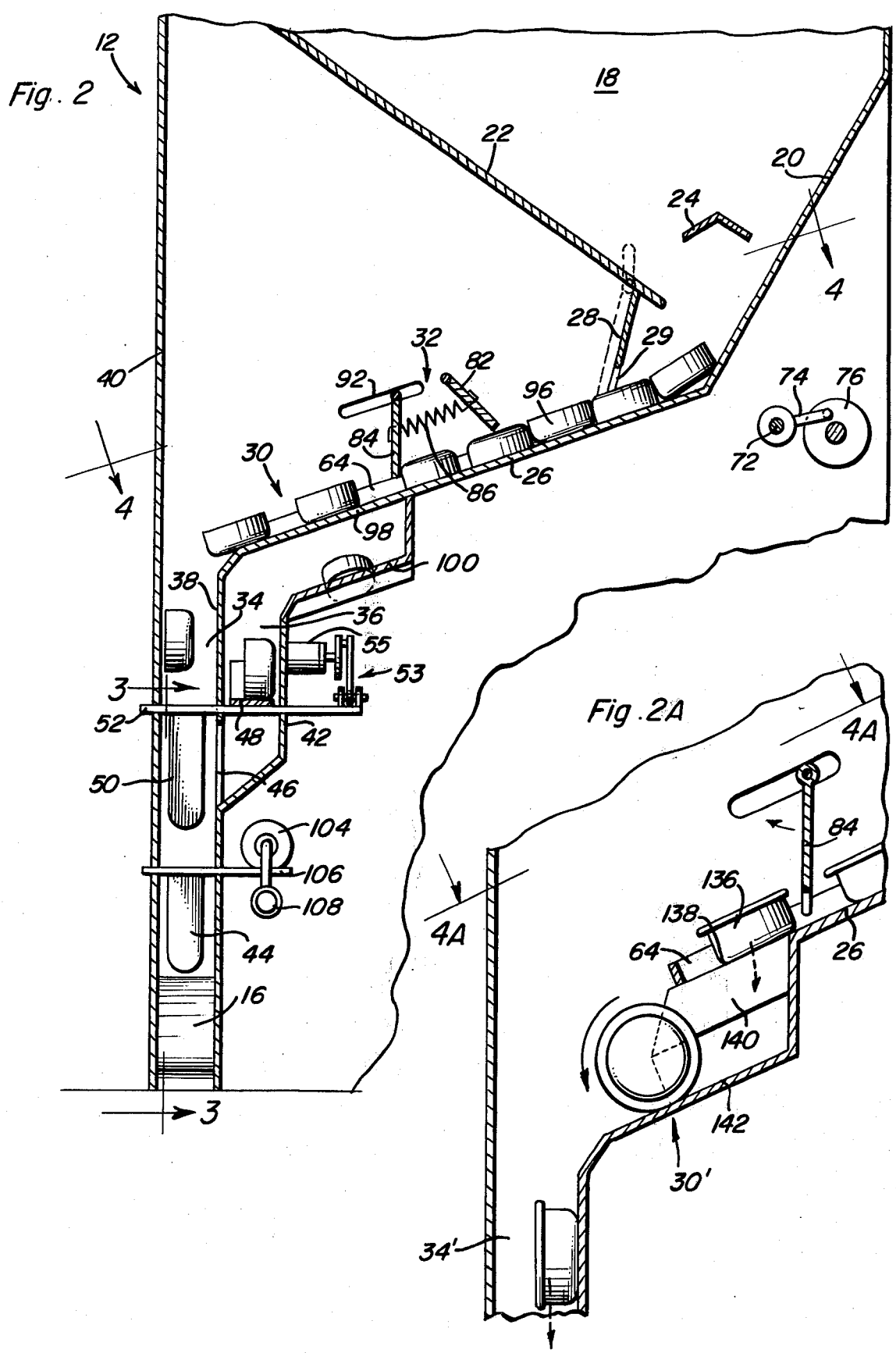

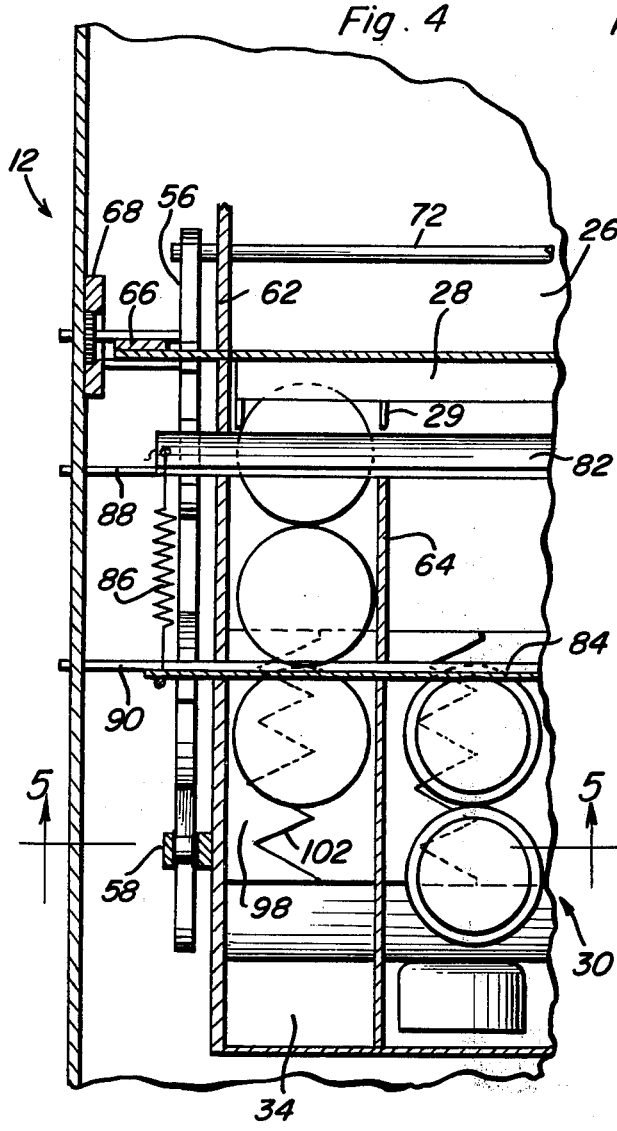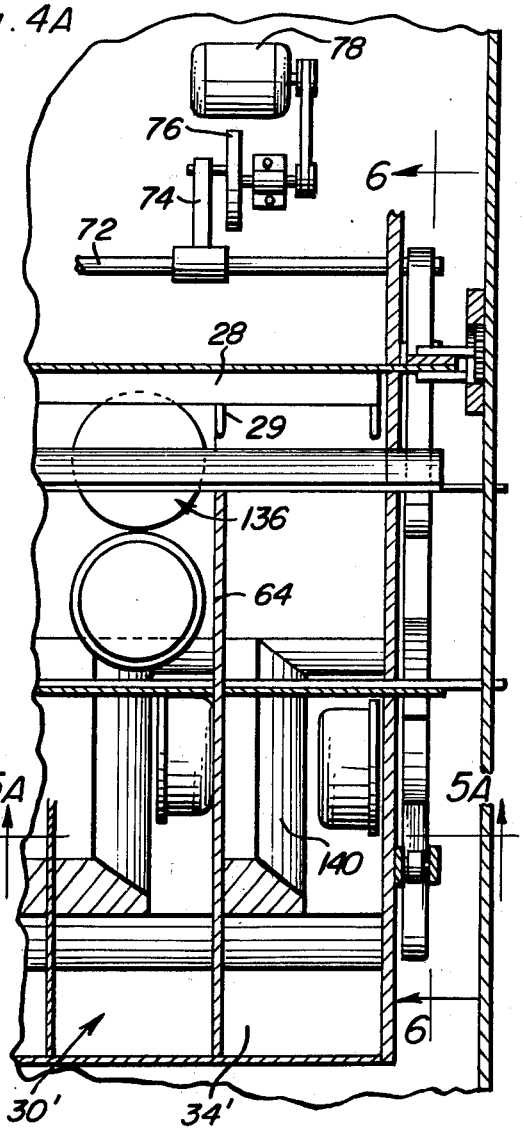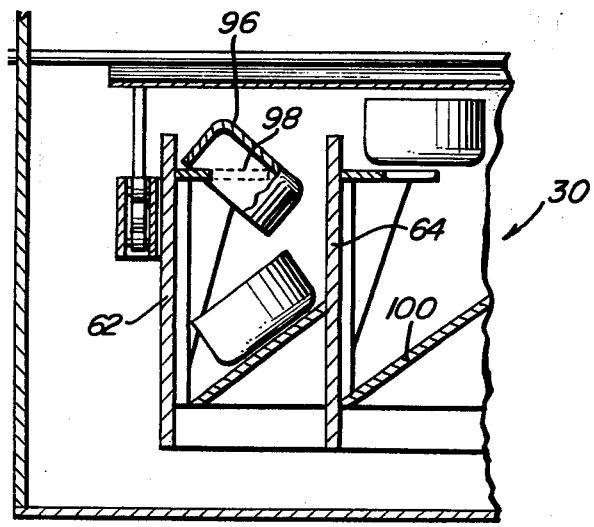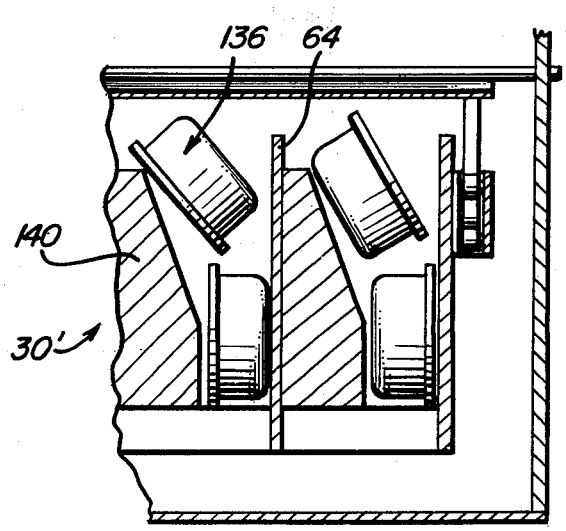

CAP SELECTING AND FEEDING MECHANISM

This invention relates to the feeding, selection and orientation of articles such as bottle caps.

In the handling of articles such as bottle caps conveyed to a work station, it is necessary to deliver such articles at a controlled feed rate and in a predetermined orientated position. Article feed must be regulated to avoid overloading and malfunction of the reorientating operation. Equipment for accomplishing the foregoing functions in a satisfactory manner has been quite costly. It is therefore an important object of the present invention to provide a relatively compact and inexpensive machine or apparatus into which caps may be loaded in random fashion and from which the caps are delivered at a controlled feed rate, all in the same orientated position.

In accordance with the present invention, the caps are loaded into a hopper from which they are gravitationally fed to a reorientating mechanism at a controlled infeed rate. The caps are distributed and deposited into guide channels through which they move single file and are spaced apart by a stop device. At the lower position in the guide channel, the cap is reorientated, if required, by the reorientating mechanism. The infeed rate of caps is controlled to match the depletion of orientated caps from at least one compartment feeding caps to a delivery chute. Timers limit the intervals during which infeed and outfeed of articles is interrupted to accommodate the variables of the reorientating operation.

These together with other objects and advantages which will beome subsequently apparent reside in the details of construction and operation as more fully hereinafter described and claimed, reference being had to the accompanying drawings forming a part hereof, wherein like numerals refer to like parts throughout.

FIG. 2 is a partial, enlarged sectional view taken substantially through a plane indicated by section line 2—2 in FIG. 1.

FIG. 2A is an enlarged partial section view showing a modified portion of the apparatus as shown in FIG. 2.

FIG. 4 is a partial top sectional view taken substantially through a plane indicated by section line 4—4 in FIG. 2.

FIG. 4A is a partial top sectional view similar to FIG. 4 but showing a modification of the apparatus.

FIG. 5 is a transverse sectional view taken substantially through a plane indicated by section line 5—5 in FIG. 4.

FIG. 5A is a partial transverse sectional view taken substantially through a plane indicated by section line 5A—5A in FIG. 4A.

Figure 1:
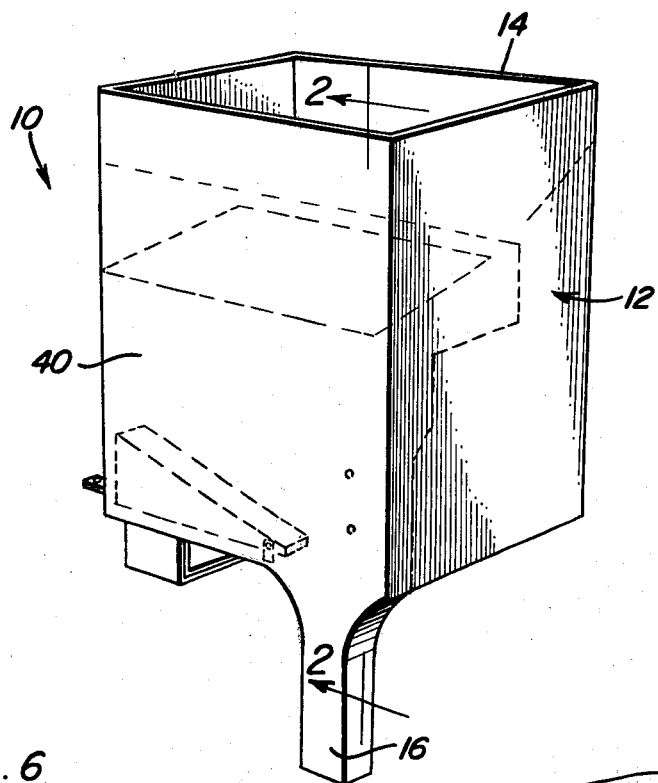
FIG. 1 is a perspective view of a typical embodiment of the present invention.

Referring now to the drawings in detail, the apparatus of the present invention as shown in FIG. 1, is generally referred to by reference numeral 10. The apparatus includes a cabinet or housing generally denoted by reference numeral 12 forming a hopper adjacent its upper open end 14 into which bottle caps or the like are loaded and from which the caps are controllably fed to a discharge chute 16. While the caps are received in random orientation through the upper hopper end 14, they are delivered from the discharge chute 16 at a controlled rate in the same orientation.

Figure 6:
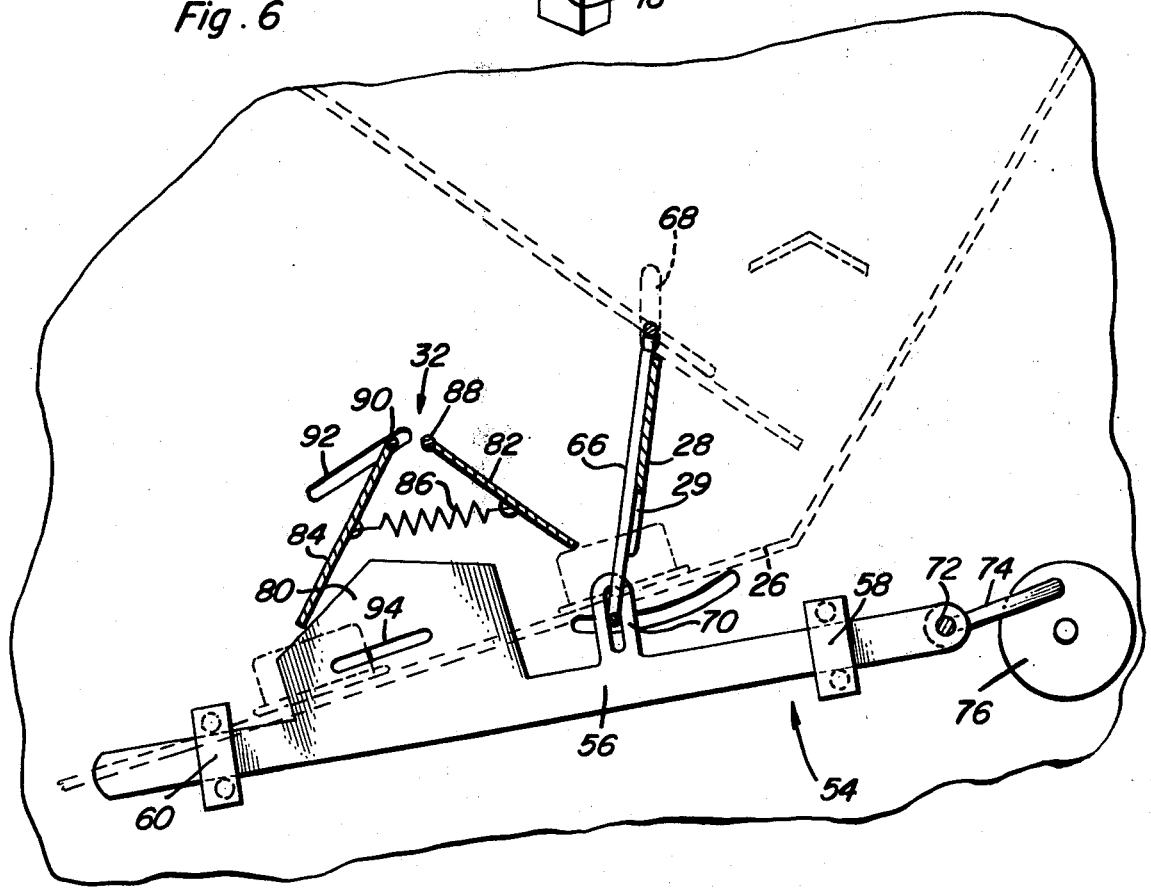
FIG. 6 is a partial sectional view taken substantially through a plane indicated by section line 6—6 in FIG. 4A.

As shown in FIG. 2, the hopper portion 18 of the housing includes a lower outlet formed between downwardly converging wall section 20 and 22. A divider 24 temporarily blocks the fall of some caps to prevent jamming and insures that the caps drop single file from the hopper outlet onto a downwardly inclined ramp 26. A feed control gate 28 is displaceable between solid line and dotted line positions as shown in FIGS. 2 and 6 to prevent passage of caps carried on top of the cap in contact with the ramp 26. The caps are gravitationally fed down the ramp and enter a reorienting assembly 30 in spaced relation to each other. The spacing between caps is regulated by a spacing control assembly generally referred to by reference numeral 32. The reorientating assembly is operative to deliver the caps in the same orientation to a front compartment 34 and a rear compartment 36. The compartments are slightly wider than the caps and extend laterally of the delivery chute 16. A partition wall 38 separates the compartments and extends downwardly from the reorientating assembly 30 between front wall 40 of the housing and the rear wall section 42. The delivery chute 16 extends downwardly from the front compartment 34 adjacent one lateral side as more clearly seen in FIG. 3. A pivoted gate 44 controls te outflow of caps alternately from the front compartment into the delivery chute 16 and from the rear compartment 36. The caps exit the rear compartment 36 through opening 46 and are supported therein on a downwardly inclined ramp 48. An upper oscillating gate 50 prevents caps in compartment 34 from blocking opening 42. The gate 50 is connected by pivot shaft 52 to a vibrator 53 driven by motor 55.

The spacing control assembly 32 and feed control gate 28 are operated in synchronized relation to each other by a drive assembly 54 as more clearly seen in FIG. 6. The drive assembly includes reciprocating drive bars 56 slidably mounted by slide bearings 58 and 60 adjacent the sides of the housing on opposite lateral sides of the ramp 26. As more clearly seen in FIG. 4, the ramp is supported between side wall sections 62 and is divided into channels by channel dividers 64. The width of each channel is slightly larger than the outside diameter of a cap so as to limit movement of caps to a single file along parallel paths. Laterally spaced legs 29 in substantial alignment with the channel dividers 64, depend from the botton edge of the feed control gate 28 and are closely spaced above the ramp 26 to guide the caps into the channels formed by the dividers. The gate 28 is carried by supports 66 on the outside of the side wall sections 62. The supports are pivotally suspended from guide rails 68 and are operatively connected to slotted drive arms 70 fixed to the drive bars 56 as more clearly seen in FIG. 6. The gate 28 is thus cyclically displaced or oscillated by the drive bars 56. The drive bars are interconnected with each other by a shaft 72. A connecting rod 74 interconnects the shaft 72 with a crank disc 76 driven by a feed control motor 78 as shown in FIG. 4A. The speed of motor 78 therefore controls the infeed rate of caps through the apparatus.

The spacing of the caps along the direction of travel is regulated by the spacing control assembly 32 in synchronized relation to operation to the gate 28 by means of cam formations 80 on the drive bars 56. The cam formation 80 as shown in FIG. 6, engages the pivoted stop elements 82 and 84 of the spacing control assembly which are interconnected by a spring 86. The cam formation alternately engages and releases adjacent caps to space the same before entering the reorientating assembly. The stop elements respectively depend from pivot shafts 88 and 90 mounted by the housing. The position of the pivot shaft 90 is adjusted through slot 92 to accommodate caps of different sizes in conjunction with cam extensions secured to the cam formation 80 through adapter slot 94.

Figure 8:
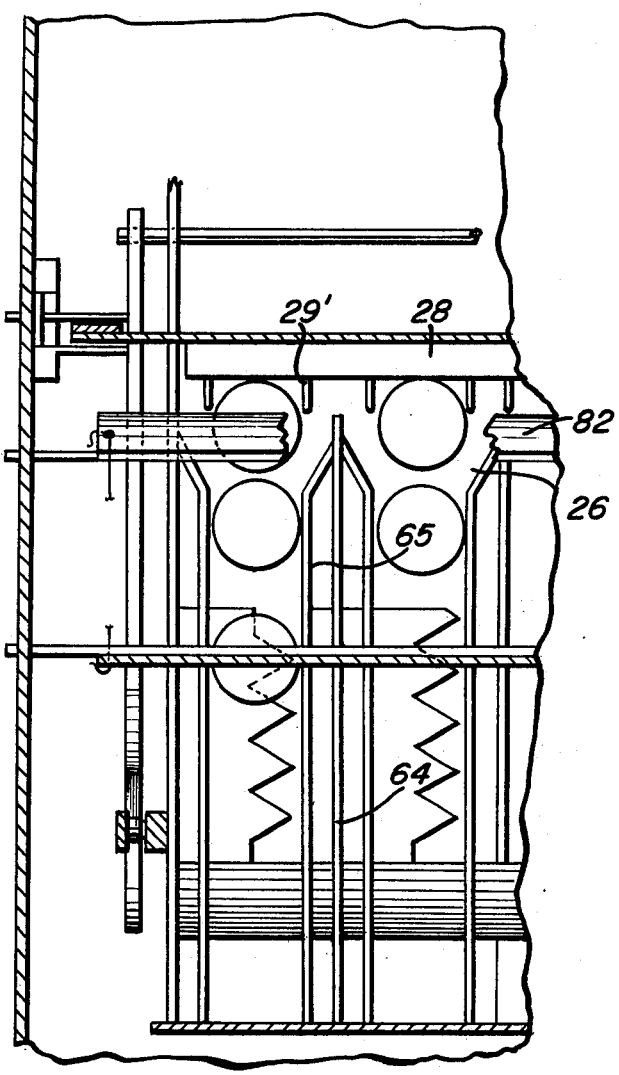
FIG. 8 is a partial top sectional view similar to FIG. 4, showing a modification.

In order to handle smaller diameter caps, more closely spaced legs 29' are provided on the feed control gate 28 as shown in FIG. 8. Also, the channels between the dividers 64 are narrowed by fence elements 65 extending laterally from the sides of each divider.

With reference to FIGS. 2, 4 and 5, caps 96 of the type shown feed single file in each channel into the reorientating assembly 30 which includes an upper level guide track 98 aligned with the ramp 26 and a lower level guide track 100 vertically spaced below in parallel relation to the upper track. The upper track 98 is connected to the partition wall 38 and guides caps into the front compartment 34 while the lower level track is connected to the rear wall section 42 and guides caps into the rear compartment 36. The upper level track 98 extends only partially across each channel between dividers 64 and has saw-tooth edges 102 as shown in FIG. 4. Accordingly, those caps entering the reorientating assembly 30 with open end down will drop off the upper track 98 as shown in FIG. 5 and come to rest on the lower track with its open end up. Caps entering the assembly 30 with the open end up, will remain on the upper track 98. Accordingly, caps 96 orientated the same way will be respectively deposited into compartments 34 and 36.

Figure 3:
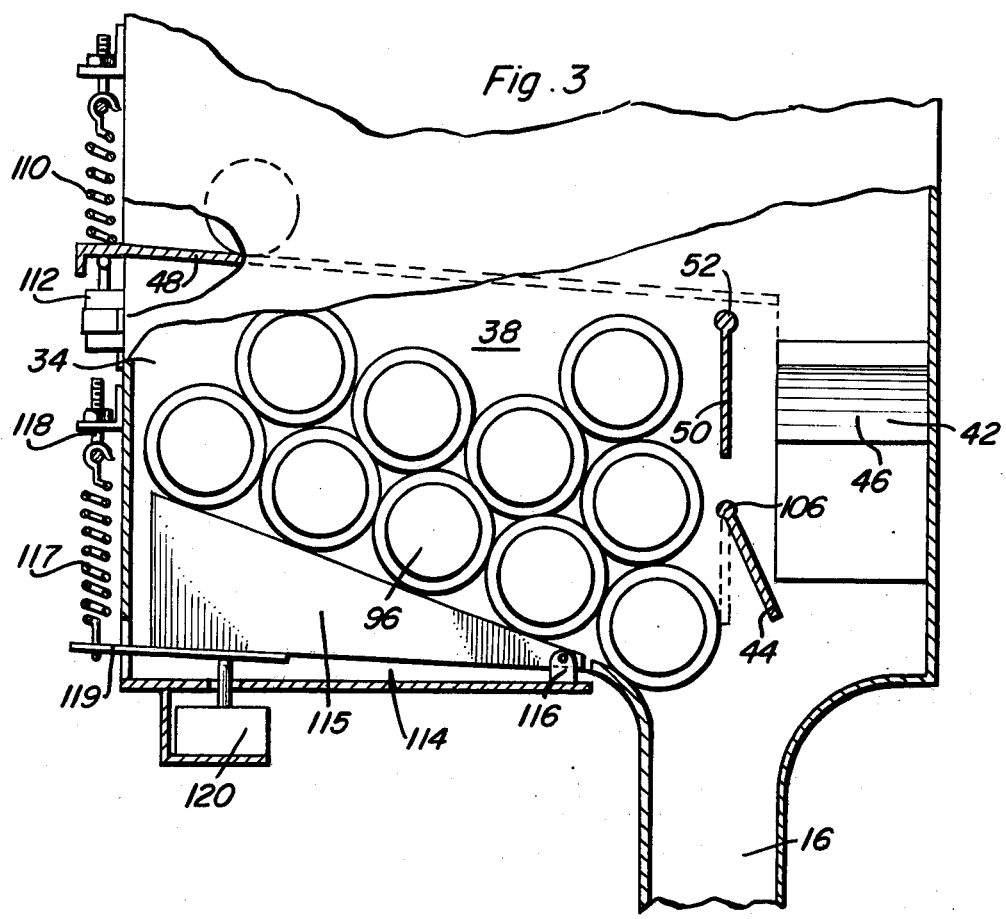
FIG. 3 is an enlarged partial front elevational view of the apparatus with a portion broken away and shown in section.

With reference to FIGS. 2 and 3, the caps 96 in compartment 34 are retained therein by gate 44 that is displaced from its dotted line position by a solenoid operator 104 to permit emptying of compartment 36 and block outflow from the rear compartment 36. The gate 44 is pivoted by a shaft 106 and is biased to the dotted line position shown in FIG. 3 by spring 108 shown in FIG. 2 to normally prevent delivery of caps to delivery chute 16 from compartment 34. The cap supporting ramp 48 in compartment 36 is displaceable under load against the bias of a spring 110 to actuate a switch 112. Thus, when the rear compartment is empty, this condition is sensed by switch 112.

The depleted condition of front compartment 34 is sensed by a weighting device 114 shown in FIG. 3. The caps in compartment 34 are supported on a pivoted ramp 115 pivotally mounted adjacent delivery chute 16 by pivot bracket 116. The ramp 115 is biased upwardly by a spring 117 connected between an adjustable anchor 118 and an actuator arm 119. When depressed under load, the ramp 115 is operative through arm 119 to actuate switch 20 to provide a signal that compartment 34 is full.

Figure 7:
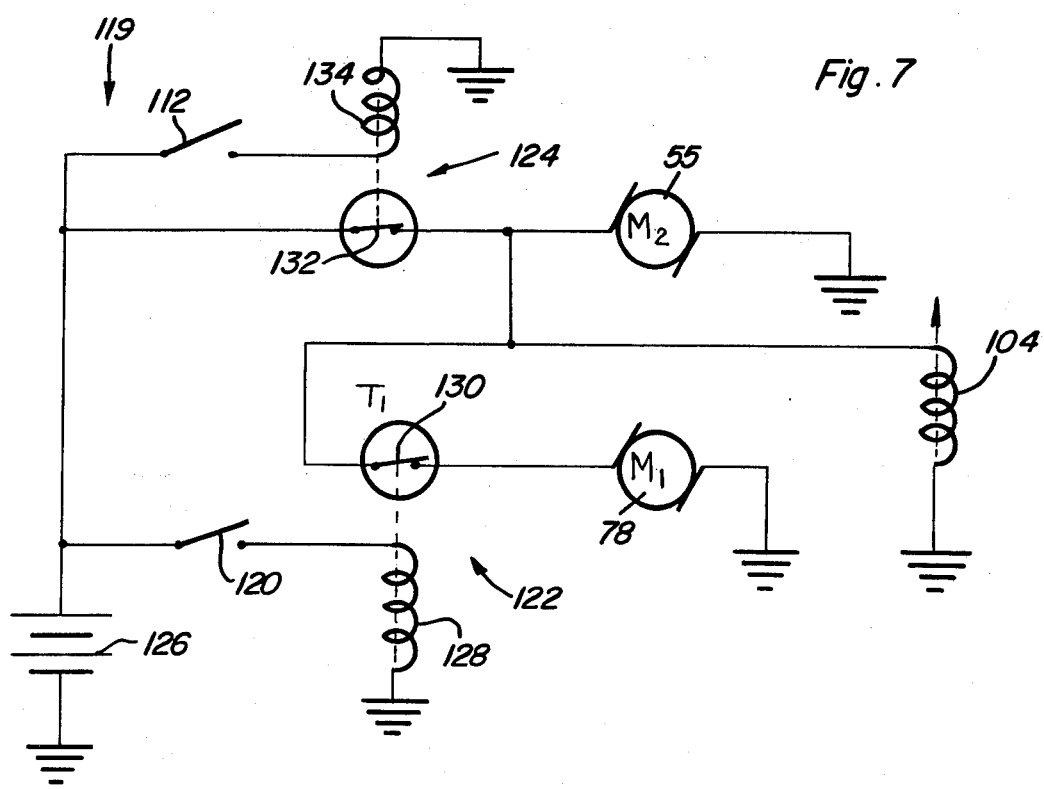
FIG. 7 is an electrical circuit diagram corresponding to the control system associated with the apparatus of the present invention.

FIG. 7 illustrates a typical control circuit 119 through which operation of the apparatus is controlled by a pair of spring-powered timer assemblies 122 and 124 mounted at any suitable location in the apparatus. A suitable source 126 of electrical energy is associated with the control circuit so that both feed motor 78 and vibrator motor 55 are normally energized to effect feeding of caps to both compartments 34 and 36 and oscillation of upper gate 50. Solenoid 104 is also energized to hold gate 44 in the position shown in FIG. 3 blocking exit of caps from the rear compartment 36. Upon closing of switch 120 in response to a full load of caps 96 in front compartment 34, the timer solenoid 128 is energized to open normally closed timer switch 130 for a predetermined period of time. Upon opening of timer switch 130, the energizing circuit established for feed control motor 78 through normally closed timer switch 132, is interrupted and motor 78 is de-energized to permit depletion of caps from front compartment 34. The supply of caps in compartment 34 is depleted as long as solenoid 104 remains energized through normally closed timer switch 132 to prevent emptying of the rear compartment 36.

At the end of the timing cycle of timer 122, motor 78 is reenergized to resume feeding of caps to both compartments. When the rear compartment is filled, switch 112 is closed to energize timer solenoid 134. The timer switch 132 is thus opened to de-energize solenoid 104, motor 55 and motor 78 for a predetermined timing interval. Caps are then delivered from rear compartment 36 of the delivery chute 16 while outflow from compartment 34 is blocked by gate 44. Operation of motor 78 is resumed to resupply both compartments 34 and 36 with orientated caps at the end of the timing cycle of timer 124.

It will be apparent from the foregoing description of the control circuit that the larger storage compartment 34 will normally feed caps to the delivery chute 16 as long as caps are fed thereto at a higher rate than they are delivered to delivery chute 16, the feed of caps being intermittently interrupted to prevent oversupply. When the rear compartment 36 is filled, feeding of caps to the compartments is also interrupted and caps are then delivered from the rear compartment until it is depleted as sensed by switch 112. Switch 112 thus opens to permit reenergization of both motors 78 and 55 so that normal feed to and from front compartment 34 may be resumed.

Figure 9:
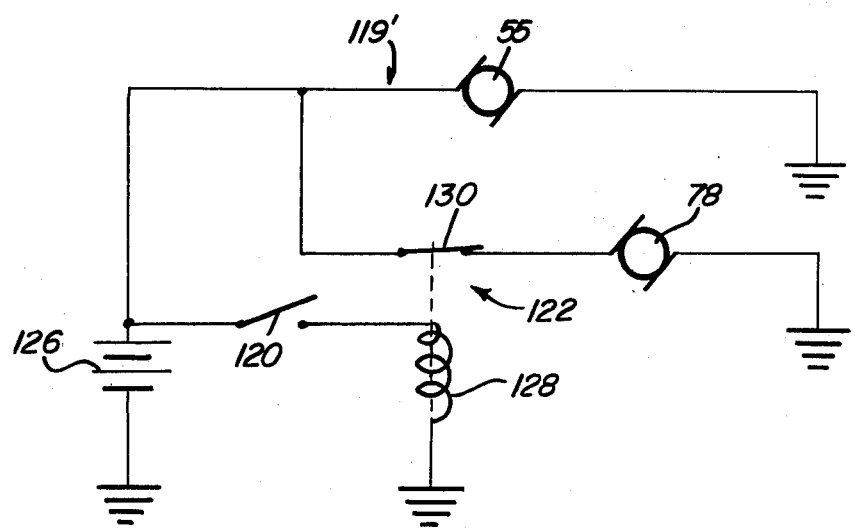
FIG. 9 is a modified form of the circuit diagram shown in FIG. 7.

A modified form of apparatus is shown in FIGS. 2A, 4A and 5A adapted to accommodate caps 136 of the type having a flanged rim 138 at its open end. This modified form of apparatus has a single vertical compartment 34' as shown in FIG. 2A into which the caps 136 from a modified form of reorientating assembly 30'. A control circuit 119' is provided as shown in FIG. 9 for coordinating operation of feed control motor 78 with weight sensing device 114 in compartment 34'. Thus, timer assembly 25 solenoid 104, gate 44 and switch 112 are eliminated. Circuit 119' will continuously energize motors 55 and 78 until switch 120 is actuated to temporarily de-energize the feed control motor 78 for a timed period, permitting depletion of compartment 34' when overloaded.

The caps 136 enter the assembly 30' between channel dividers 64 and are directed by guides 140 (FIGS. 4A and 5A) onto a ramp section 142 along which they roll on the flanged rims 138 toward the compartment 34'. In order to enter compartment 34' each cap 136 will pivot on its rim in one direction or the other depending on its orientation to assume the same orientation in compartment 34'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for storing and dispensing articles one at a time in a predetermined orientation, comprising a cabinet having a hopper, fixed channel means mounted within said cabinet for guiding movement of said articles from the hopper, a storage compartment into which the articles are deposited from the channel means, a delivery chute into which the articles are discharged from the storage compartment, guide means for reorientating articles during movement through the channel means to supply articles to the storage compartment in the same orientation, feed controlling gate means for respectively regulating infeed of the articles to the channel means from the hopper and outfeed of the articles from the storage compartment to the delivery chute, sensing means for detecting depletion of articles stored in the storage compartment by predetermined amount and control means connecting the sensing means to the feed controlling gate means for intermittently blocking infeed of articles to the storage compartment and outfeed therefrom in accordance with the effect of said reorientating operation on the supply of articles to the storage compartment.

2. Apparatus for storing and dispensing articles one at a time in a predetermined orientation, comprising a cabinet having an upper hopper portion, channel means mounted within said cabinet for guiding movement of said articles single file from the hopper portion, a storage compartment into which the articles are deposited from the channel means, a delivery chute into which the articles are discharged from the storage compartment, guide means for reorientating articles during movement through the channel means to supply all articles to the storage compartment in the same orientation, feed controlling means for respectively regulating infeed of the articles to the channel means from the hopper portion and outfeed of the articles from the storage compartment to the delivery chute, sensing means for detecting depletion of articles stored in the storage compartment by a predetermined amount and control means connecting the sensing means to the feed controlling means for intermittently blocking infeed of articles to the storage compartment and outfeed therefrom in accordance with reorientating operation of the guide means, a second storage compartment to which the articles are fed from the guide means, said control means including gate means for retaining articles within the second storage compartment until outfeed from the first mentioned storage compartment is blocked.

3. The combination of claim 2 including stop means engageable with the articles in the channel means for spacing the same before reorientation by the guide means.

4. The combination of claim 3 including means for synchronizing operation of the stop means with the feed controlling means.

5. The combination of claim 4 wherein said channel means includes a downwardly inclined ramp, and a plurality of channel dividers mounted thereon to form parallel paths along which the articles are gravitationally fed single file.

6. The combination of claim 5 wherein said articles are caps projecting above the channel dividers for engagement by the stop means.

7. The combination of claim 8 wherein said guide means includes an upper track aligned with the ramp and a lower track spaced therebelow, said upper track presenting a surface supporting the articles only in one orientated position, whereby the articles in another orientated position are gravitationally transferred to the lower track and assume said one orientated position.

8. The combination of claim 7 wherein the articles are fed from the lower track of the guide means to the second storage compartment.

9. The combination of claim 5 wherein said guide means includes an upper track aligned with the ramp and a lower track spaced therebelow, said upper track presenting a surface supporting the articles only in one orientated position, whereby the articles in another orientated position are gravitationally transferred to the lower track and assume said one orientated position.

10. The combination of claim 9 wherein the articles are fed from the lower track of the guide means to the second storage compartment.

11. The combination of claim 3 wherein said channel means includes a downwardly inclined ramp, and a plurality of channel dividers mounted thereon to form parallel paths along which the articles are gravitationally fed single file.

12. The combination of claim 11 wherein said articles are caps projecting above the channel dividers for engagement by the stop means.

13. The combination of claim 2 wherein said channel means includes a downwardly inclined ramp, and a plurality of channel dividers mounted thereon to form parallel paths along which the articles are gravitationally fed single file.

14. The combination of claim 13 wherein said guide means includes an upper track aligned with the ramp and a lower track spaced therebelow, said upper track presenting a surface supporting the articles only in one orientated position, whereby the articles in another orientated position are gravitationally transferred to the lower track and assume said one orientated position.

15. The combination of claim 14 wherein the articles are fed from the lower track of the guide means to the second storage compartment.

16. In an article dispensing apparatus, a pair of storage compartments, feed regulating means for controlling the supply of articles to said compartments, load control means connected to the feed regulating means for intermittently blocking infeed and outfeed of articles to and from one of the compartments, a delivery chute connected in a parallel to said compartment into which articles are discharged alternatively from said compartments, gate means for blocking discharge of articles from the other of the compartments until outfeed from said one of the compartments is blocked, means for reorientating articles supplied to the other of the compartments to establish the same orientation of articles in both of the compartments, said load control means including means for sensing overload of articles in said other of the compartments to block outfeed from said one of the compartments.

* * * * *